US012298525B2

United States Patent
Wächter et al.

(10) Patent No.: US 12,298,525 B2
(45) Date of Patent: May 13, 2025

(54) MULTICHANNEL OPTOMECHANICAL ADDRESSING UNIT

(71) Applicant: Fraunhofer-Gesellschaft zur Förderung der angewandten Forschung e.V., Munich (DE)

(72) Inventors: Christoph Wächter, Jena (DE); Bernd Höfer, Jena (DE); Peter Schreiber, Jena (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 559 days.

(21) Appl. No.: 17/569,457

(22) Filed: Jan. 5, 2022

(65) Prior Publication Data

US 2022/0128827 A1 Apr. 28, 2022

Related U.S. Application Data

(63) Continuation of application No. PCT/EP2020/068966, filed on Jul. 6, 2020.

(30) Foreign Application Priority Data

Jul. 8, 2019 (DE) .......................... 102019210041.4

(51) Int. Cl.
G02B 27/09 (2006.01)
G02B 3/00 (2006.01)
(Continued)

(52) U.S. Cl.
CPC ....... *G02B 27/0905* (2013.01); *G02B 3/0087* (2013.01); *G02B 6/06* (2013.01);
(Continued)

(58) Field of Classification Search
CPC ................ G02B 27/09; G02B 27/0905; G02B 27/0983; G02B 27/0955; G02B 27/0961;
(Continued)

(56) References Cited

U.S. PATENT DOCUMENTS 6,028,722 A 2/2000 Lang
6,044,096 A 3/2000 Wolak et al.
(Continued)

FOREIGN PATENT DOCUMENTS

CA 2306722 A1 10/2000
CN 1627180 A 6/2005
(Continued)

OTHER PUBLICATIONS

Crain, S. et al., "Individual addressing of trapped 171Yb+ ion qubits using a microelectromechanical systems—based beam steering system," Applied Physics Letters, pp. 181115, (2014). 5 pages.
(Continued)

*Primary Examiner* — Jie Lei
(74) *Attorney, Agent, or Firm* — Perkins Coie LLP; Michael A. Glenn

(57) ABSTRACT

An optical device for imaging a first, object-side set of mutually parallel bundles of beams onto an image surface, includes
- an optical beam expansion unit;
- an optical rearrangement unit configured to rearrange the first set of mutually parallel bundles of beams while maintaining mutually parallelism to obtain a second set of mutually parallel bundles of beams;
- an optical element configured to direct the second set of one or more bundles of beams onto the optical beam expansion unit by means of bundling, so that the optical beam expansion unit is reached by a third set of bundles of beams, (Continued)

the optical beam expansion unit being configured to expand each bundle of beams of the third set to obtain a fourth set of expanded bundles of beams; and an optical imaging unit configured to image the fourth set of expanded bundles of beams onto the image surface.

20 Claims, 10 Drawing Sheets

(51) Int. Cl.
    *G02B 6/06*         (2006.01)
    *G02B 23/02*       (2006.01)
    *G02B 26/08*       (2006.01)
    *G02B 27/30*       (2006.01)

(52) U.S. Cl.
    CPC ......... *G02B 23/02* (2013.01); *G02B 26/0816* (2013.01); *G02B 27/0955* (2013.01); *G02B 27/30* (2013.01)

(58) Field of Classification Search
    CPC .. G02B 27/0966; G02B 27/30; G02B 27/143; G02B 27/283; G02B 3/00; G02B 3/0087; G02B 6/06; G02B 26/08; G02B 26/0816; G02B 23/02; G02B 21/32; G02B 19/0014; G02B 19/0028; G02B 19/0057; G02B 19/0047
    USPC ......... 359/223.1, 241.1, 615, 618, 621, 556, 359/639, 834; 372/50.12, 50.23, 101, 107
    See application file for complete search history.

(56) References Cited

U.S. PATENT DOCUMENTS

| | | |
|---|---|---|
| 6,424,759 B1 | 7/2002 | Jing |
| 2004/0252388 A1 | 12/2004 | Yamanaka et al. |
| 2005/0053101 A1* | 3/2005 | Liu ..................... H01S 3/0675 372/6 |
| 2005/0068633 A1 | 3/2005 | Grenier et al. |
| 2005/0128921 A1 | 6/2005 | Inoko |
| 2011/0103056 A1 | 5/2011 | Wolak et al. |
| 2014/0300971 A1 | 10/2014 | Wolak et al. |
| 2015/0286121 A1 | 10/2015 | Kilcher et al. |
| 2016/0091785 A1 | 3/2016 | Inoko et al. |
| 2017/0315360 A1 | 11/2017 | Takeda |

FOREIGN PATENT DOCUMENTS

| | | |
|---|---|---|
| CN | 1879062 A | 12/2006 |
| CN | 105467736 A | 4/2016 |
| CN | 106292145 A | 1/2017 |
| DE | 19918444 A1 | 2/2001 |
| JP | S61-025120 A | 2/1986 |
| JP | 2002277765 A | 9/2002 |
| JP | 2007156057 A | 6/2007 |
| JP | 2009503593 A | 1/2009 |
| JP | 2011520292 A | 7/2011 |
| JP | 2015523597 A | 8/2015 |
| JP | 2016085429 A | 5/2016 |
| WO | 2007014662 A1 | 2/2007 |

OTHER PUBLICATIONS

Rickert, J., "Simultaneous and individual ion addressing for quantum information processing," Leopold-Franzens-Universitat Innsbruck, Institute of Experimental Physics, (2018). 89 pages.

James, D.V.F., "Quantum dynamics of cold trapped ions with application to quantum computation," Applied Physics 8, pp. 181-190, (1998). 10 pages.

Koernschild, C. et al., "MEMS-Based Optical Beam Steering System for Quantum information Processing in 2D Atomic Systems," Optics Letters, pp. 273-275, (Mar. 2008). 4 pages.

DiCon Fiberoptics "MEMS Matrix Optical Switches" Retrieved Feb. 6, 2019, via the Internet Archive at https://web.archive.org/web/20190112014548/http://www.diconfiberoptics.com:80/products/mems_matrix_optical_switches.php. 2 pages.

* cited by examiner

MULTICHANNEL OPTOMECHANICAL ADDRESSING UNIT

CROSS-REFERENCES TO RELATED APPLICATIONS

This application is a continuation of International Application No. PCT/EP2020/068966, filed Jul. 6, 2020, which is incorporated herein by reference in its entirety, and additionally claims priority from German Application No. DE 102019210041.4, filed Jul. 8, 2019, which is incorporated herein by reference in its entirety.

The invention relates to a device for imaging an object-side set of mutually parallel bundles of beams onto an image surface.

BACKGROUND OF THE INVENTION

There are cases of application wherein light from a multitude of optical sources, which may be provided by several optical fibers, is to be directed onto very small regions within an image plane. An example of this is quantum computing, where the light beams are directed at ions located within suitable ion traps. The interionic distance amounts to few micrometers. A wavelength of the light used depends on the specifics of the ions used and typically ranges from UV to NIR. The distances between the ions within a trap depend on various parameters. Marked changes in the interionic distances result when the trap is loaded with different numbers of ions. Minor changes occur, for example, because of interference fields within the trap. It should therefore be possible to direct the beams onto regions within the ion trap plane in manner that may be variably adjustable, with simultaneous highly precise trackability of the focus position.

Similar problems also occur in other technical fields, however, such as in optical data communication, for example.

A simple variant of addressing different ions consists in using a single source and sequential addressing of the individual ions as described in: Crain, S. et al., "Individual addressing of trapped 171Yb+ ion qubits using a microelectromechanical systems-based beam steering system," *Applied Physics Letters*, pp. 181115, 1-4, 2014. As ion numbers increase, however, sequential operation become a bottleneck for fast performing of Qubit operations at various ion positions. In addition, expanding the scheme in terms of including larger ion numbers results in an increase in size of the intermediate image plane, as is also described in Crain, S. et al., or Knoernschild, C. et al., "MEMS-based optical beam steering system for quantum information processing in two-dimensional atomic systems", *Optics Letters*, pp. 273-275, 2008, and therefore results in increasing demands placed upon the subsequent optical imaging units.

With MEMS mirror arrays, positions of multichannel inputs can be associated with target positions within a receiver plane. In fiber switch setups, collimation and identical focusing lenses are typically used in the input- and output-side channels for the 1:1 image formations to be realized. Within this context, mirror arrays have resulted in that for any associations of inputs with outputs, the bundle impinges, on the output side, upon a corresponding channel position on-center and perpendicularly. This involves predefined, fixed positioning of the output-side mirrors in accordance with a fixed arrangement of the output channels. Consequently, variable positions of output channels are difficult to achieve with such setups.

On the basis of fixed input-side source positions within a fiber array, a MEMS mirror array may be used in connection with subordinate optical elements for addressing ion positions without intermediate imaging being used: cf. in Rickert, J., "Simultaneous and individual ion addressing for quantum information processing," Leopold-Franzens-Universität Innsbruck, Institute of Experimental Physics, 2018. Within this context, a collimated bundle starting from the fiber is expanded. The subsequent objective transforms the bundle within its focal plane to a Gaussian waist adapted to the requirements of the imaging task. A source position located outside an optical axis as well as an inclination toward the optical axis which implements a desired shift in position within the focal plane, however, lead to losses in transmission if the optical units are not widely opened. Consequently, approaches where an optical-unit diameter per se is to be scaled with the number of channels is not suitable since the number of channels thus remains limited from the very start if the size of an optical device is limited.

SUMMARY

According to an embodiment, an optical device for imaging a first, object-side set of mutually parallel bundles of beams onto an image surface may have: an optical beam expansion unit; an optical rearrangement unit configured to rearrange the first set of mutually parallel bundles of beams while maintaining mutually parallelism so as to obtain a second set of mutually parallel bundles of beams; an optical element configured to direct the second set of one or more bundles of beams onto the optical beam expansion unit by means of bundling, so that the optical beam expansion unit is reached by a third set of bundles of beams, the optical beam expansion unit being configured to expand each bundle of beams of the third set so as to obtain a fourth set of expanded bundles of beams; and an optical imaging unit configured to image the fourth set of expanded bundles of beams onto the image surface.

A core idea of the present invention consists in that a concept of imaging a first, object-side set of bundles of beams onto an image surface which is more effective with regard to imaging locations and/or numbers of bundles of beams may be achieved when the bundles of beams are provided such that they extend in parallel on the input side and when the bundles of beams are rearranged, while maintaining parallelism, prior to beam expansion with subsequent optical imaging units, and when the transition between the rearranged bundles of beams to beam expansion is effected via an optical element which directs the rearranged bundles of beams onto the optical beam expansion unit by means of bundling (or concentrating), i.e. by means of mutual superposition, so that the optical beam expansion unit with a subsequent optical imaging unit may be implemented in a form which is essentially independent of a number and/or rearrangement of the bundles of beams. This leads to an optical device for imaging a first, object-side set of mutually parallel bundles of beams, for example each originating from a glass-fiber end, onto an image surface, for example with an optical beam expansion unit; an optical rearrangement unit configured to rearrange the first set of mutually parallel bundles of beams while maintaining mutually parallelism so as to obtain a second set of mutually parallel bundles of beams; an optical element configured to direct the second set of one or more bundles of beams onto the optical beam expansion unit by means of bundling, so that the optical beam expansion unit is reached by a third set of bundles of beams, the optical beam expansion unit being configured to expand each bundle of beams of the third set so as to obtain a fourth set of expanded bundles of beams; and an optical imaging unit, e.g. an objective, configured to image the fourth set of expanded bundles of beams onto an image surface or an image plane.

In other words, embodiments enable achieving high precise optical association of a multitude of input-side light source points with output-side target points, wherein target and/or end points, which may be essentially arranged within one plane, respectively, are not necessarily stationary in this, i.e. in the transversal, direction, and the spacing ratios of source and target points may involve imaging that clearly increases or decreases the distances.

For example, a bundle that is weakly convergent or weakly divergent, in a ray-optical sense, may be generated for each channel on the input side by means of a collimator, for example a convergent lens. For example, the collimator captures highly divergent light of an optical source and generates a beam having reduced divergence. Thus, mutually parallel bundles of beams having low divergence originate within the channels.

Said bundles of beams may be individually bent (redirected), via suitable bending means, such that they, as a plurality of mutually parallel weakly divergent bundles, impinge upon an imaging optical element such as a convergent lens or a parabolic mirror, for example.

For this plurality of largely parallel, weakly convergent or weakly divergent bundles, various angles of reflection of the bundles result, e.g., on account of individual locations of impact on the imaging optical element, so that they largely superimpose one another within a focal plane of the optical element, such as, e.g., in a disc located within the focal plane; the bundles do not lose their non-collimated property, or convergence, or divergence, even in the ray-optical sense, on account of the imaging optical element, but retain their characteristic of being bundles within the focal plane and do not coincide at one point in each case.

The bundle cross-sections may be expanded by means of an optical beam expansion unit which is implemented as a telescope, for example. On the input side, the optical beam expansion unit should have a size corresponding to at least 1.5 times the bundle diameters, which come to lie one on top of the other. On the output side, the size of the optical beam expansion unit may be minimized, for one thing, by its alignment in accordance with an optical axis, which results from the propagation direction of a central bundle after the imaging optical element, and, for another thing, from its distance from the imaging optical element, which distance results, in the case of a telescope being used for beam expansion, from the focal length of the imaging optical element and from the focal length of an input-side lens within the telescope. Within this context, the useful enlargement scale which results from the mutual distances of the source points and from the mutual distances of the target points—with non-equidistant distances and mean values that are adapted in each case—may be set via the ratios of the focal length of the objective and the focal length of the imaging optical element as well as via an enlargement factor of the beam expansion, and at the same time, the bundle diameter which is present, on the output side, at the optical beam expansion unit and, on the input side, at the objective, may be adapted to the respective requirements by adapting the divergence of the input bundles.

Further embodiments and further advantageous aspects of the optical device are mentioned in the respectively dependent claims. The effects and advantages of the features of the embodiments which shall be discussed—below equally apply to individual groups of optical elements of the optical device as to the optical device as a whole and may be interchanged and/or combined with one another.

Advantageously, the optical device includes a source for each bundle of beams of the first set of bundles of beams from which the respective bundle of beams impinges upon the optical rearrangement unit.

Advantageously, monomode fibers are used as the source of a bundle of beams. However, as defined by other embodiments, multimode sources may be used, even though in this case lateral dimensions for collimation also become clearly larger. For example, a collimator used for a monomode fiber may be a gradient index lens.

In an even further advantageous embodiment, the optical device for generating weakly convergent or divergent bundles of beams includes a collimator for each bundle of beams of the first set of bundles of beams through which the respective bundle of beams passes in the direction of the optical rearrangement unit. A collimation lens captures the highly diverging laser power, for example from an optical fiber, and generates a beam having reduced divergence, which in turn enables moderate propagation distances.

Advantageously, the optical element of the optical device is configured to bundle light, which impinges in parallel with the second set of bundles of beams, toward a point at, or approximately at a distance smaller than double a focal length of an input-side optical element of the optical beam expansion unit in front of or behind, the input-side optical element. Within this context, the bundles of beams of the third set of bundles of beams will superimpose one another, due to their still existing convergence or divergence, at the point within a predetermined area, e.g. a circle. In other words, the bundles which superimpose one another within the focal plane in the predetermined area will maintain their characteristic of being bundles, also in the ray-optical sense, due to their convergence and divergence, respectively, and will not coincide in one point, respectively. Each bundle which has passed through the optical element so as to superimpose with the others is advantageously weakly divergent and will thus impinge upon the optical beam expansion unit. The bundles of beams which converge toward the optical element at various distances from the axis and in parallel with one another are deflected by the optical element, and superimpose one another in the focal length of the optical element. The original positions/orientations, i.e. various transverse locations and equal angle—paraxial bundles of beams—are thus transferred, by the optical element, to form a set of bundles which share the same location at the focal plane of the optical element but differ with regard to their respective angles and directions.

The sources of the bundles of beams may be arranged in a one- or two-dimensional manner, and rearrangement may be implemented in a one- or two-dimensional manner.

In a particularly advantageous embodiment, the above-mentioned distance of the focal planes of the optical element at which superposition takes place ranges between 0.5 and 1.5 times the focal length of the input-side optical element.

In a still more advantageous embodiment, the distance ranges between 0.5 and 1.5 times $f_{T1}+\Delta$, with $$\Delta = \frac{f_{T1}}{f_{T2}}(f_{T1} + f_{T2}) - f_{T1} = f_{T1}^2/f_{T2}$$

wherein $f_{T1}$ is the focal length of the input-side optical element, and $f_{T2}$ is the focal length of the output-side optical element of the optical beam expansion unit, which together form a telescope.

The above-mentioned superposition of the bundles in front of the input-side optical element of the optical beam expansion unit results in effective superposition of the illumination of the output-side optical element with the possibility, associated therewith, to configure the latter in a small size even in case of a large number of bundles of beams.

In accordance with an advantageous embodiment, the optical imaging unit has a diameter larger than or equal to 1.5 times a cross-section of a bundle of beams of the fourth set of bundles of beams at the point. At this location, perfect superposition of Gaussian bundles is possible.

A simple and low-cost design in accordance with an advantageous embodiment provides for the optical element to be configured as a one- or multi-stage refractive optical unit.

A particularly compact design in accordance with an advantageous embodiment provides for the optical element to be configured as a reflective optical unit, advantageously as a parabolic mirror.

In accordance with an advantageous embodiment, the optical rearrangement unit may be controlled to set rearrangement of the second set of bundles of beams—with regard to a lateral arrangement of bundles of beams—as compared to the first set of bundles of beams. As a result, individual bundles of beams may be superimposed and be displaced from their original positions, for example so as to achieve a particularly dense arrangement of bundles of beams or to arrange the original bundles of beams at defined distances from one another. In other words, the rearrangement unit rearranges the incoming bundles of beams while maintaining mutually parallelism, so that every other output-side bundle of beams is bijectively associated with one of the incoming first bundles of beams, and so that the lateral mutual arrangement of the bundles of beams will change between the first set of bundles of beams and the second set.

In accordance with an embodiment that is simple to produce and to set up, the optical rearrangement unit of the optical device comprises mechanically adjustable mirrors.

For the purpose of easy adjustment, or setting, of the mechanically adjustable mirrors, the optical device in accordance with an embodiment includes bearings, e.g. spring connections or moveable bearings, via which the mechanically adjustable mirrors are linearly moveable, such as in parallel with the incoming bundles of beams. By means of linear movements, bundles of beams may be rearranged while their mutually parallelism is maintained. As a result, originally rigid positions of the paraxial bundles of beams, which originate from the source $Y_i^{source}$ and are located at different spatial positions, may be displaced in parallel with one another.

So as to guarantee as precise rearrangement, or alignment, of bundles of beams as possible, the optical rearrangement unit may comprise mechanical and/or piezoelectric and/or magnetically controllable actuating elements, e.g. for the linear movements of the mirrors. By means of such actuating elements, one may achieve highly precise control of the bundles of beams.

Conveniently, the optical rearrangement unit of the optical device is configured to achieve rearrangement such that distances covered are maintained, so that each bundle of beams of the first set of bundle of beams, when passing through the optical rearrangement unit so as to become a bundle of beams of the second set of bundles of beams, covers a distance that is independent of any setting of the rearrangement, or is independent of any position of the bundle of beams once it has been rearranged. Thus, any changes in the bundles which are dependent on distances covered are avoided. Thus, they will impinge upon the optical element with the same diameter and/or waist location, irrespectively of the selected, or set, rearrangement.

In accordance with an advantageous embodiment, the optical rearrangement unit comprises a rigid mirror arranged, along an optical path of the optical device, behind the adjustable mirrors. The arrangement may be such that the bending angle amounts to 90° in each case, with a rigid mirror and with adjustable mirrors. Arranging such a mirror is particularly advantageous when all of the bundles of beams are bent in the same manner once they have left the adjustable mirrors.

In accordance with another advantageous embodiment, the optical rearrangement unit is configured to rearrange the first set of bundles of beams, that are parallel to the beam direction, while maintaining parallelism with one another and with the beam direction in such a manner that the second set of bundles of beams will also be parallel to the beam direction, i.e. to the first set of bundles. Maintaining parallelism is particularly expedient with regard to impingement upon a reflective, or refractive, optical element, in terms of an essentially uniform change in the properties and/or orientation of the bundle of beams.

In accordance with an embodiment, the optical beam expansion unit is configured as a refractive telescope.

In accordance with a further advantageous embodiment, the optical beam expansion unit is configured as a reflective telescope. An optical device using such a reflective telescope avoids chromatic aberrations within the optical beam expansion unit.

In one embodiment of the optical device, the bundles of beams of the first set comprise monochromatic light of high intensity. Monochromatic light enables precise measurement and/or localization of objects within an image plane since the properties of individual bundles of beams that are directed by means of various optical elements of the optical device remain essentially the same and may thus be controlled in the same manner.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
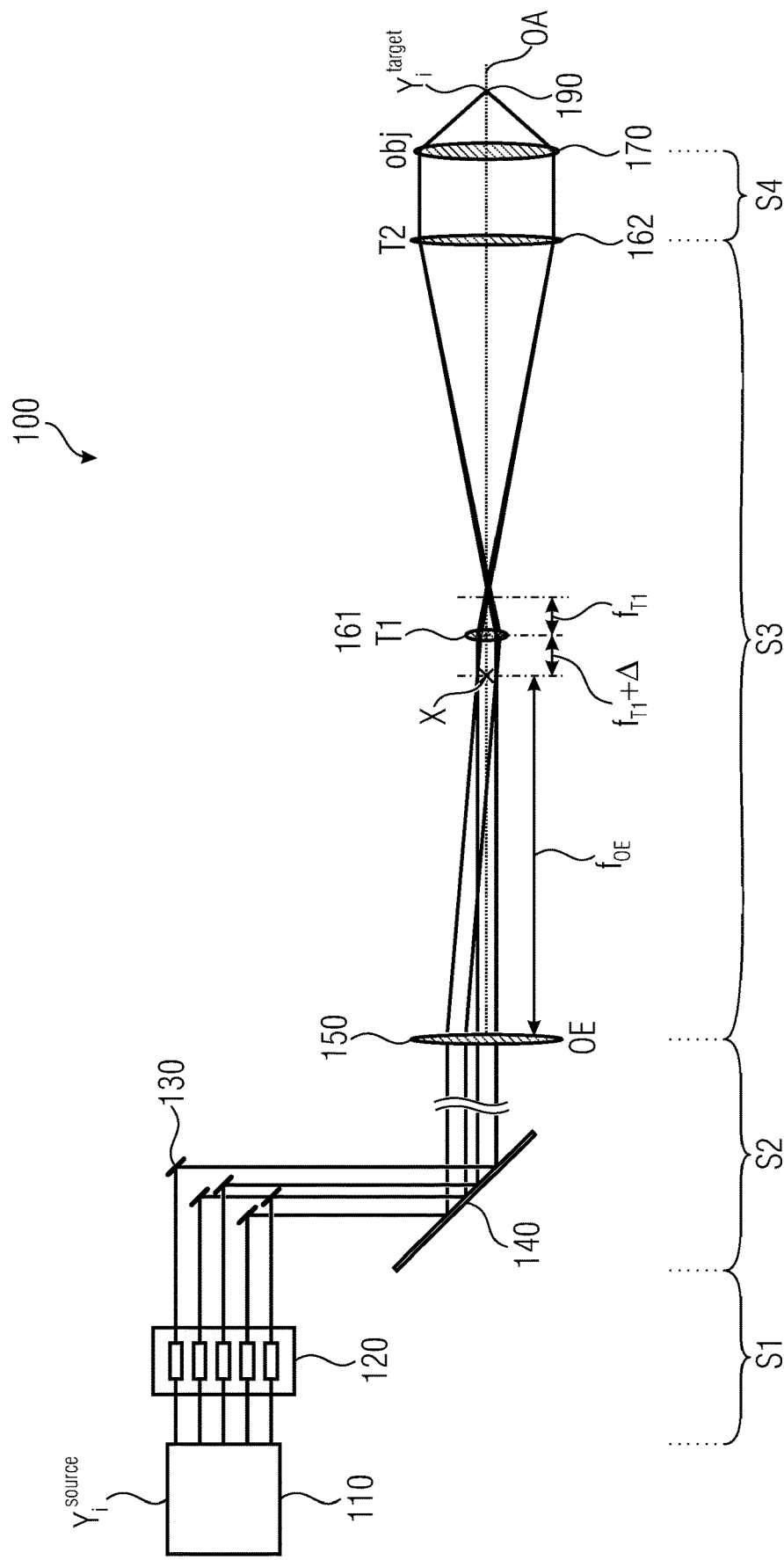
FIG. 1 shows a schematic diagram of an optical device in accordance with an embodiment.

In the following, embodiments will be described in more detail with reference to the figures, wherein elements having identical or similar functions have been provided with identical reference numerals.

FIG. 1 illustrates a schematic diagram of an optical device 100 in accordance with an embodiment. In this context, the optical device 100 corresponds to a multichannel optomechanical addressing unit for imaging a multitude of mutually parallel bundles of beams onto an image surface 190. Starting from a source 110, several bundles of beams, which form a first set S1 one bundle of beams, are directed onto the image surface 190 via the optical device 100. The individual bundles of beams of the first set S1 are aligned to be parallel to one another. In other words, different source points $Y_i^{source}$ within an input plane are associated with, or imaged onto, specific target points $Y_i^{target}$ within the image surface 190.

One or more monomode sources may serve as the source 110 for the bundles of beams of the first set S1 of bundles of beams. Light from a laser source is transmitted, e.g., via splitters, from one monomode fiber to several monomode fibers whose ends will then serve as sources of the individual bundles of beams of the set S1, or one uses several monomode lasers, without or with fiber coupling, for providing the set S1 of bundles of beams.

The bundles of beams of the first set S1 of bundles of beams are forwarded to a rearrangement unit 130, 140. This may be effected by means of a collimator 120 such as a gradient index lens, for example, for each bundle and/or channel.

The bundles of beams of the first set S1 may comprise monochromatic light. The monochrome property may be due to the technical field of application of the optical device 100, such as in a quantum computer, but may also be advantageous in other fields of application so as to avoid chromatic aberrations.

As an alternative to the above description, the bundles of beams of the first set S1 may also originate from multimode sources, i.e. from a multimode laser or a multimode fiber. For each channel and/or bundle of the set S1, a suitable collimator may be provided; in this case, the dimensions for collimating the bundles of beams might possibly be larger than with a monomode valiant. For example, each bundle of the set S1 stems from a multimode fiber, a VCSEL, or a channel of a VCSEL array. In the event of multimode production, the bundles of the set S1 might be generated by an array of VCSELs, followed by a microlens array and/or one more microlens for each VCSEL.

The rearrangement unit rearranges the first set S1 of mutually parallel bundles of beams while maintaining their mutually parallelism, so that a second set S2 of mutually parallel bundles of beams is obtained. Subsequently, embodiments will be described wherein the rearrangement unit is mechanically adjustable, or may be set to different rearrangements.

The second set S2 of mutually parallel bundles of beams is directed, via the rearrangement unit 130, 140, to an optical element 150 configured to direct the second set S2 of one or more bundles of beams onto an optical beam expansion unit 161, 162 by means of bundling, so that the optical beam expansion unit 161, 162 is reached by a third set S3 of bundles of beams. The optical element 150 is configured to bundle light, which impinges in parallel with the second set S2 of bundles of beams, toward a location of a point X at, or approximately at a distance $f_{T,1}+\alpha$ smaller than double a focal length $f_{T,1}$ of an input-side optical element T1 of the optical beam expansion unit 161, 162 in front of or behind, the input-side optical element T1. Because of the divergence which advantageously is inherent in each of the bundles of beams of the second set, the bundles of beams of the third set S3 will superimpose one another at the point X within an expanded area. In other words, each bundle of beams of the set S2 is bent by the optical element 150 and is directed toward the point X as one of the bundles of the set S3, so as to superimpose there with the other bundles of the set S3. Superposition takes place within an expanded surface area. The directions with which the bundles of the third set S3 are directed toward the point X bijectively depend on the lateral location where the corresponding bundle of beams of the set S2 impinges upon the optical element.

In the embodiment of FIG. 1, the optical element 150 is configured as a one-stage refractive optical unit. In accordance with further embodiments, the optical element 150 may also be configured as a multi-stage refractive optical unit or as a reflective optical unit.

In the present embodiment of FIG. 1, the point X of the superposition of the third set S3 of bundles of beams is located in front of the input-side optical element T1, for example a convergent lens of a telescope formed by the optical beam expansion unit 161, 162. The optical beam expansion unit 161, 162 is configured to expand each bundle of beams of the third set S3 of bundles of beams so as to obtain a fourth set S4 of expanded bundles of beams. In FIG. 1, the optical beam expansion unit 161, 162 is formed of a telescope which comprises a lens T1 on the input side and a lens T2 on the output side. The fourth set S4 of bundles of beams is imaged onto the image surface 190 via an optical imaging unit 170 arranged downstream from the optical beam expansion unit 161, 162. In this context, the optical imaging unit 170 is configured, in the embodiment of FIG. 1, to focus the fourth set S4 of expanded bundles of beams onto the image surface 190.

By means of the optical beam expansion unit 161, 162, which here is depicted as an astronomic telescope comprising two optical elements, or lenses, T1, T2, one manages to superimpose the bundles of beams—which are made to essentially superimpose one another at the point X in front of the telescope—of the third set S3 of bundles of beams on a plane, which here is an input-side surface of the optical imaging unit 170, to form a fourth set S4 of bundles of beams with a bundle diameter that is expanded as compared to the third set of bundles of beams, and with less variance in the bundle propagation direction among the bundles, the fourth set S4 of bundles of beams being focused onto the image plane 190 by the optical imaging unit 170.

Monomode Gaussian bundles suitable for focusing onto, e.g., ions, are subject to the laws of Gaussian beam optics. Embodiments of the present invention such as that of FIG. 1, for example, manage to produce waist sizes—of the bundles focused onto the image plane 190—which may be very small and essentially depend only on the size, or the diameter, of the optical imaging unit 170 and on the wavelength, but are essentially independent of the number of bundles of beams in the sets S1 to S4. To illustrate this, reference shall initially be made to FIG. 2.

Figure 2:
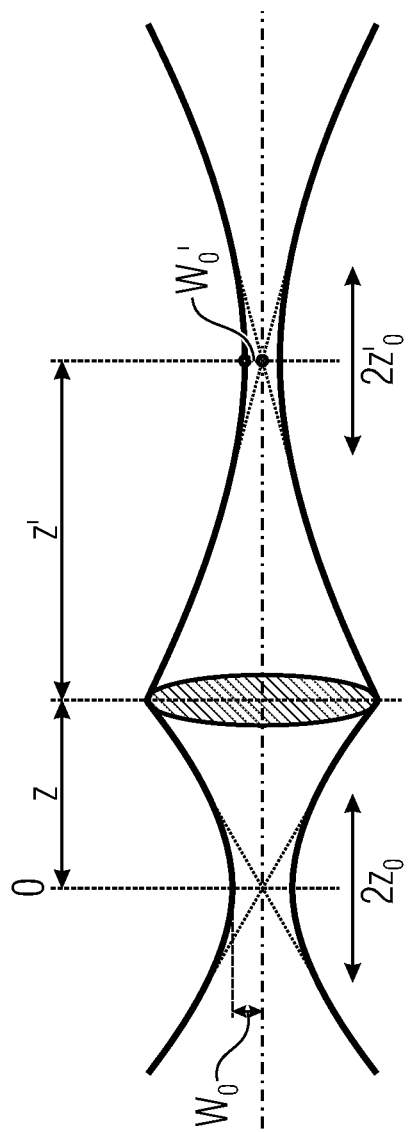
FIG. 2 shows a schematic diagram for illustrating a conventional model of a Gaussian beam and/or Gaussian bundle of beams.

FIG. 2 illustrates a conventional model of a Gaussian beam, or Gaussian bundle of beams, which is used for the purpose of approximation for calculating and depicting the behavior of bundles of beams in accordance with the embodiments listed here.

Accordingly, the bundles of beams of the wavelength are characterized by corresponding waists $w_0$ and angles $\theta_0$ in accordance with $$\theta_0 = \frac{\lambda}{\pi w_0} \quad (1)$$

and by beam radii in accordance with the distance z from the waist W $$W(z) = w_0 \sqrt{1 + \left(\frac{z}{z_0}\right)^2} \quad (2)$$

wherein $z_0$ is the Rayleigh length $$z_0 = \frac{\pi w_0^2}{\lambda} \quad (3)$$

by means of which the beam radius is enlarged to $\sqrt{2}$ times of the waist value W.

By means of optical elements, Gaussian waists are transformed to one another, the bundle cross-sections increasing in size away from a waist W, and tapering toward a waist W.

An illuminated area of an optical element located within the optical, or bundle, path is related to an angle of aperture $\theta_0$ of the bundle of beams and to a distance z from the waist plane. For a smaller waist size, the angle of aperture of the bundle becomes larger, which means that with a given distance from the optical element and the waist, the illuminated area of the optical element becomes accordingly larger. So as to ensure sufficient energy inclusion of >99% within the Gaussian bundle of beams, elements which are located in the optical path and which potentially have an effect of limiting bundles, additionally may have at least a diameter of three times the bundle radius present at this point.

In known technical approaches, abaxial bundles, or bundles which are markedly inclined toward an optical axis OA—indicated as a dotted line—have the tendency that requirements placed upon the respective size and quality of the optical elements increase, or that with limited sizes of the optical elements, transmission losses caused by partial cutting off of a Gaussian distribution—of the beam intensity—arise. Corresponding effects occur, for example, because of source-side arrangements or of beam deflections which are useful for associating source points $Y_i^{source}$ with target points $Y_i^{target}$.

In accordance with an embodiment of the present invention, the diameter of the optical imaging unit 170, which is configured as an objective, for example, is not substantially larger, and the focal length is not substantially smaller, than may be used for producing a waist of the size $w_{target}$—which enables spatially resolved addressing of the target points $Y_i^{target}$ in the image surface 190—and than may be used for achieving transmission of >99% for Gaussian bundles. The objective 170 comprises a focal length $f_{obj}$ and a diameter $D_{obj}$ and transforms the bundle of beams within its focal plane, which corresponds to the image surface 190, to a Gaussian waist $W_{target}$ adapted to the requirements of the imaging task.

The aperture of the optical imaging unit 170, for example of an objective, in this context is referred to as the numeral aperture (NA), a size defined via $$NA = \sin(\theta) = \sin\left(\operatorname{atan}\left(\frac{D_{obj}/2}{f_{obj}}\right)\right). \quad (4)$$

In accordance with (1) and (4), while taking into account the demand of transmission of >99%, the angle of aperture that an objective may have as a minimum, is determined to be $$\theta_{oeff} = \operatorname{atan}\left(\frac{D_{obj}/2}{f_{obj}}\right) = 1.5 \cdot \frac{\lambda}{\pi w_{target}}, \quad (5)$$

wherein technical conditions of the setup such as the distance of the objective from the target plane and/or the expansion of the latter specify the focal length and/or the diameter of the objective.

Optomechanical beam bending by means of the optical rearrangement unit and beam expansion by means of the optical beam expansion unit may therefore be configured, in the embodiments of the optomechanical system, such that for each channel, the expanded bundle which impinges upon the objective remains within the diameter of the objective that is determined in accordance with the technical conditions, and almost fully illuminates the former.

In the above-described manner, embodiments of the present invention simultaneously enable highly precise association of a multitude of input-side light source points $Y_i^{source}$ with output-side target points $Y_i^{target}$ within a target plane, or image surface, the target points $Y_i^{target}$ not necessarily being stationary. For example, load-dependent interionic distances or ion positions influenced by stray fields may be tracked in ion traps, for example. The optical overall arrangement, which is centered with regard to an optical axis OA by means of the objective and is set in terms of the diameter thereof, and which is enabled by suitable micro optomechanics, allows using objectives whose specifications with regard to a numerical aperture essentially depend only on the resolution requirements within the target plane and depend, with regard to their focal lengths, essentially only on the working distance that is due to construction-related reasons. In the event that, e.g., the image surface 190 lies within an ion trap, the above-mentioned working distance may be given, e.g., by a thickness of a vacuum window and by a distance of the trap from the window. Scaling operations toward larger ion numbers are thus not limited, as is the case with other optomechanical approaches, by clearly more expensive objectives having larger numerical apertures or larger diameters. In a similar manner, this also applies to other technical examples of applying the device 100. The limited numerical objective aperture, which may be used in the embodiments of the present invention, additionally limits, due to a larger depth of focus, the expenditure involved in longitudinally adjusting the objective with regard to the image surface 190, such as an ion plane, for example. Optical units which are folded and which, apart from the objective, are purely reflective enable compact setups which are also independent onf wavelengths and may thus be used for various cases of application, e.g. for ion traps comprising $^{40}Ca^+$, $^{138}Ba^+$ or other ions.

In a specific implementation, the device of FIG. 1 may be dimensioned as follows for realizing an optomechanical addressing unit, for simplicity's sake for linear arrangement in the image surface 190, for example for linear arrangement of $^{40}Ca^+$ ions within an ion trap, such as a Paul trap. As a source 110 of a first object-side set S1 of bundles of beams extending in a mutually parallel manner, an adequate linear arrangement of input-side monomode fibers may be used. For the distances of the sources 110, fiber diameters, diameters of the collimation lenses 120, and useful channel distances are to be taken into account on the part of the mechanical system. If one assumes a reference grid, determined by the mechanical system, of 500 µm, collimation lenses 120 having diameters below 500 µm are to be selected. If the sources can be arranged within different, e.g. oppositely located, planes, collimation lenses 120 having diameters below 1 mm are possible. For the distances of $^{40}Ca^+$ ions within the ion trap, an average value of approx. 5 µm, e.g., may be estimated, from which results a imaging scale of 100:1 for their distances. The wavelength for the optical device 100, or optical addressing unit, for $^{40}Ca^+$ ions amount to 729 nm. A mode field radius of a supplying monomode fiber 110 of approx. 2.5 µm may be considered, with good approximation, to be an input Gaussian waist. A rearrangement unit 130, 140, which is to be arranged within the optical path and whose side has an upper limit set by the channel distance, limits the bundle diameter of the beams. At this location, a bundle radius should therefore be kept below 150 µm. If individual interionic distances at the center of the ion trap are below 5 µm, it will be advantageous to select the size of a bending element, e.g. of an adjustable mirror 130, to be below 500 µm; i.e. advantageously, the bundle diameter W at the bending element 130, 140 will have to be selected to be smaller than 100 µm. FIG. 1 shows an advantageous implementation with a bundle that is weakly convergent behind the collimation lens 120.

For implementing the imaging scale, the optical beam expansion unit, the focal length $f_{OE}$ of the optical element 150, and the focal length $f_{obj}$ of the objective are to be suitably dimensioned. For the correlation between the distance of the source points $Y_i^{source}$ and the distance of the target points $Y_i^{target}$ without any loss of generality, in each case as a linear arrangement in the y direction, the following correlation may be found in the form of a formula, if the optical imaging element 150 has a focal length $f_{OE}$ and if the optical beam expansion unit 161, 162 is assumed to be a telescope having two lenses T1, T2 of the focal lengths $f_{T,1}$ and $f_{T,2}$:

$$Y_i^{target} = Y_i^{source} \cdot \frac{f_{obj}}{f_{OE}} \cdot \frac{f_{T,1}}{f_{T,2}} \quad (6)$$

If the optical imaging element 150 is configured as a parabolic mirror having a radius of curvature $R_{c\_mirr}$, (6) will result in the adequate correlation $$Y_i^{target} = Y_i^{source} \cdot \frac{f_{obj}}{R_{c\_mirr}/2} \cdot \frac{f_{T,1}}{f_{T,2}} \quad (7)$$

For (6) and/or (7) it shall be assumed that distances of fibers, aligned in parallel, as a source plane are translated, at a ratio 1:1, to distances from the optical axis OA of the imaging optical element 150, while maintaining parallelism, on the part of a suitable rearrangement unit 130, 140 and/or optomechanical system.

If the rearrangement unit 130, 140 enables—while maintaining the above-mentioned parallelism requirements— transformation of source positions $Y_i^{source}$ to positions designated by $Y_i^{OE}$ on the imaging optical element—which in turn describe distances from the optical axis OA—free associations of source and target points may be addressed by means of $$Y_i^{target} = Y_i^{c-OE} \cdot \frac{f_{obj}}{f_{OE}} \cdot \frac{f_{T,1}}{f_{T,2}} \quad (8)$$

and/or, in case of the parabolic mirror as an imaging optical element, by means of $$Y_i^{target} = Y_i^{c-mirr} \cdot \frac{f_{obj}}{R_{c\_mirr}/2} \cdot \frac{f_{T,1}}{f_{T,2}}. \quad (9)$$

Figure 3:
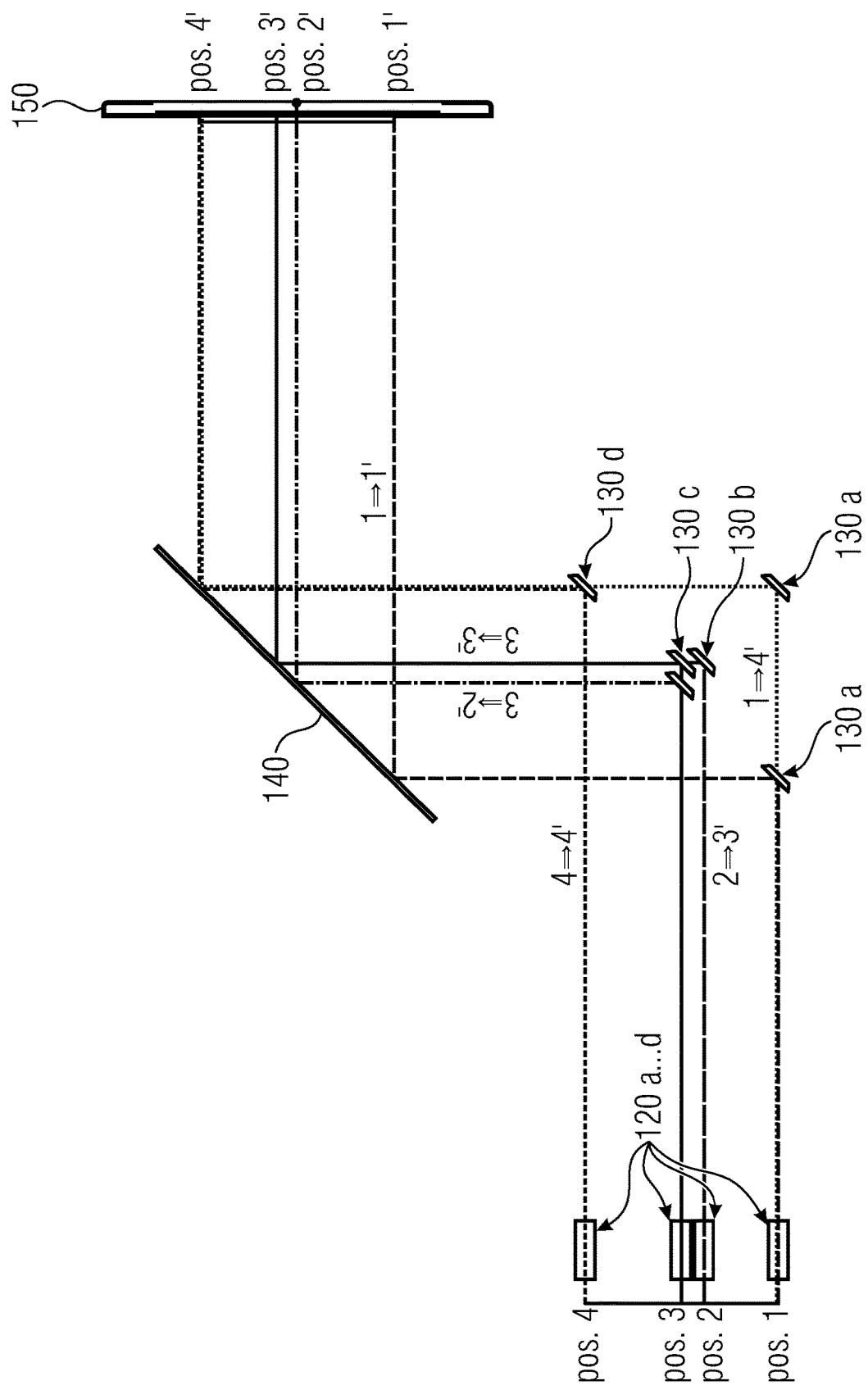
FIG. 3 shows a diagram of rearrangement unit with linearly arranged monomode fibers in accordance with an embodiment.

Possible implementations of the association of source positions $Y_i^{source}$ with positions $Y_i^{c-mirr}$ are outlined in FIG. 3 by way of example. For the purpose of depicting the variability of the associations, various possibilities are shown in an illustrative manner: the case of application provides bijective association of N source channels, or source points, $Y_i^{source}$ with N target channels, or target points, $Y_i^{target}$.

If, by way of example, one assumes an objective having an NA of 0.3, waist sizes <1.5 µm can be generated for the wavelength of 729 nm within the ion plane. Said waist sizes enable precise addressing of ion positions located at a distance of approx. 5 µm. If one continues to assume a focal length of 30 mm, which allows operation of the ion trap behind a vacuum window of a thickness of more than 10 mm, and if one uses a typical optical beam expansion unit 161, 162 for an imaging scale of 10:1, the imaging scale of 100:1, which corresponds to the ratio of the distances of the source points $Y_i^{source}$ to the distances of the target points $Y_i^{target}$ will be implemented with an optical element 150 having a focal length of 300 mm—for example with a mirror having a radius of curvature of 600 mm.

In the embodiments of the present application such as in FIG. 1, for example, e.g. the optical beam expansion unit 161, 162 is arranged at a suitable distance of $f_{OE}+f_{T,1}+\Delta$ from the parabolic mirror. Thus, the location, or point, X of the superposition of the bundles lies, at a distance $f_{T,1}+\Delta$ in front of the first lens T1 of the telescope, which in turn results in the bundles being centered on the output side of the telescope, as is shown, e.g., in FIG. 1 and FIG. 4. A possibility of determining A will be deduced hereinbelow.

Illumination of objective and/or output diameters of the optical beam expansion unit, which are given and/or demanded accordingly, is essentially set with the fiber-side optical collimation unit 120. If a conventional micro lens is used, the setting results from the fact that the object distance is selected to deviate several % from a nominal focal length f, so that the desired slight convergence, or divergence, is achieved. For example, the distance between the source, such as the laser or fiber output for example, and the collimator ranges between 0.9 and 1.1 times the nominal focal length.

An intended field of application of embodiments of the present invention are, as was already mentioned above, quantum technologies, wherein simultaneous addressing of a plurality of ions within an ion trap present a partial task that may be expediently performed. There are comparable tasks within various other fields of application—they might lie within communication technologies, within sensor systems, or within the field of beam guidance in industrial applications.

FIG. 3 illustrates an outline of a rearrangement unit 130, 140, comprising bundles of beams which stem from monomode fibers which here are linearly arranged by way of example. In the embodiment of FIG. 3, the respective monomode fibers comprise individual collimators 120a ... d, which generate a bundle of beams which in an optical sense is weakly convergent and/or weakly divergent. The individual positions pos. 1 ... 4 of the bundles of beams, which correspond to source points $Y_i^{source}$ are associated with positions pos. 1' ... 4' on the optical element 150 by means of a suitably moveable and/or adjustable mirror 130a ... d per bundle of beams and a rigid mirror 140 provided for all of the bundles of beams. Within this context, individual bundles of beams may not only be mutually displaced, but also rearranged. In FIG. 3, the individual displacements of positions pos. 1 ... 4 to pos. 1' ... 4' are indicated by arrows. The adjustable mirrors 130a ... b are advantageously supported to allow linear movement. Depending on the embodiment, the entire optical rearrangement unit 130, 140 or parts thereof may be controlled by means of mechanical and/or piezoelectric and/or magnetically controllable actuating elements. Along the optical path of the optical device 100, the optical rearrangement unit 130, 140 comprises a rigid mirror 140 which is arranged, in the optical path, behind the adjustable mirrors 130 and via which the bundles of beams are directed toward the optical element 150.

As illustrated by the example of FIG. 3, the optical rearrangement unit 130, 140 may be configured to achieve rearrangement of positions, here of pos. 1 ... 4 to pos. 1' ... 4', such that distances covered are maintained, so that each bundle of beams of the first set S1 of bundles of beams, when passing through the optical rearrangement unit 130, 140 so as to become, or contribute to, a bundle of beams of the second set S2 of bundles of beams, covers a distance that is independent of any setting of the rearrangement. In addition, the optical rearrangement unit 130, 140 is configured to rearrange the first set S1 of bundles of beams, which are parallel to the beam direction, while maintaining parallelism with one another and with the beam direction in such a manner that the second set S2 of bundles of beams is, or continues to be, parallel to the beam direction.

An advantageous setting with regard to individual optical components of the optical device 100, which enables optimum illumination of the target points $Y_i^{target}$, will be described below with reference to several consecutive diagrams.

Figure 4:
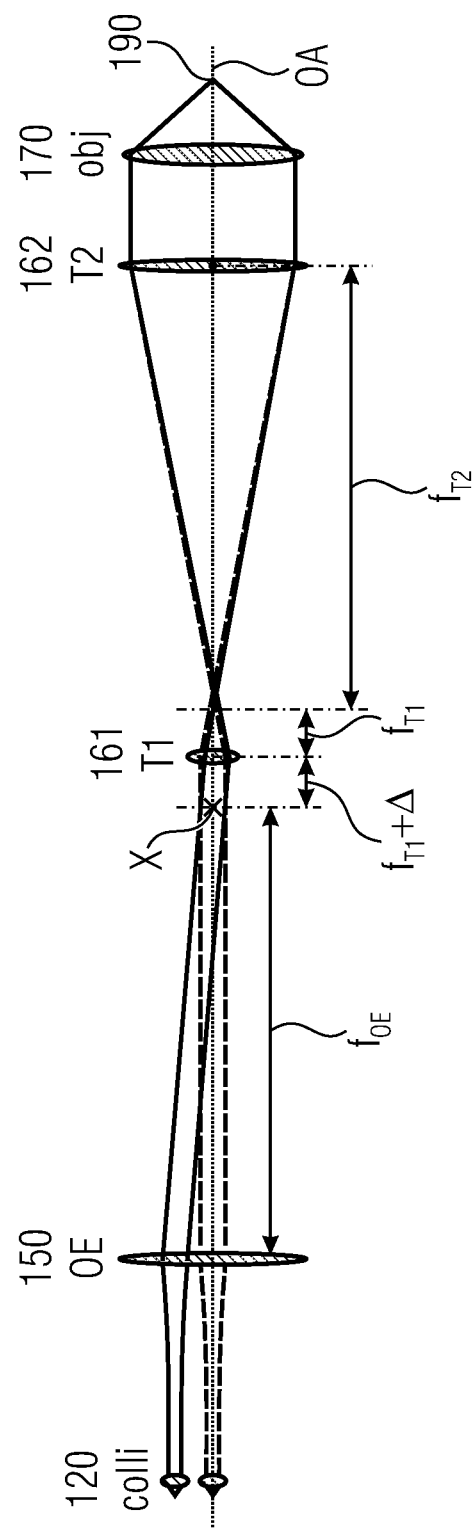
FIG. 4 shows a simplified diagram for illustrating bundle superposition of bundles of beams and beam expansion by means of an astronomic telescope for beam expansion in accordance with an advantageous embodiment.

FIG. 4 depicts a simplified diagram for illustrating bundle superposition of bundles of beams and their beam expansion by means of an astronomic telescope in accordance with an advantageous embodiment. In order to simplify matters, what is illustrated is the optical path starting from the collimators 120 of the individual bundles of beams—the rearrangement unit 130, 140 is not shown. The bundles of beams directed toward the optical element 150 exhibit only minor convergence, or divergence, and extend in parallel with an optical axis OA, which is indicated as a dotted line in the figures. The individual bundles of beams are deflected by the optical element 150. It is in the focal length $f_{OE}$ of the optical element 150 that the bundles of beams will then converge, a common center of all bundles of beams being defined by a point X, which is located in the focus of the optical element 150. Within this context, the location of the point X is arranged at a predetermined distance $f_{T,1}+\alpha$ in front of the input-side optical element, or the input-side lens T1, of the optical beam expansion unit 161, 162. In the present embodiment, the distance of point X from the input-side lens T1 is set such that expansion of the bundles of beams by means of the optical beam expansion unit 161, 162 essentially fully illuminates the output-side lens T2 as well as the optical imaging unit 170—such as an objective, for example—arranged downstream from it, e.g., illuminates more than 50%, specifically, e.g., more than 50% with regard to each expanded bundle of beams. By means of the optical element 150, the original positions/orientations of the bundles of beams, i.e., various locations and identical angles of paraxial bundles of beams, are transferred into the same location and to various angles. The sources 110, e.g., monomode sources, may also be arranged in a one- or two-dimensional manner.

Figure 5:
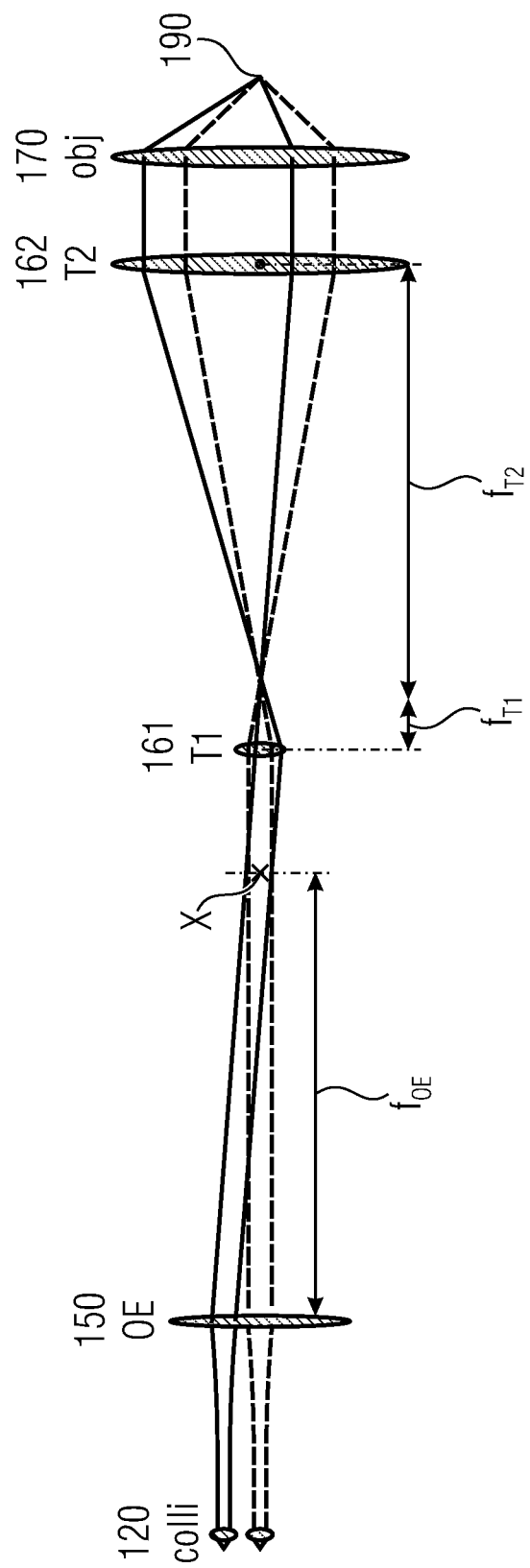
FIG. 5 shows a simplified diagram for illustrating beam expansion by means of an astronomic telescope with disadvantageous superposition of bundles.

FIG. 5 depicts a shows a simplified diagram for illustrating bundle superposition of bundles of beams and their beam expansion by means of an astronomic telescope in accordance with a further embodiment. Unlike FIG. 4, in FIG. 5, the location of the point X at a distance from the input-side optical element, or the input-side lens T1, of the telescope is determined such that the bundles of beams do not necessarily superimpose one another in the output-side optical element, or the output-side optical lens T2, or the downstream objective 170. Accordingly, FIG. 5 illustrates the optical path of a bundle with a non-adapted distance between the optical element 150 and the input-side optical element 161 of the optical beam expansion unit 161, 162.

Advantageous setting, or dimensioning, of the optical device with a view to the fact that all bundles of beams which originate in parallel from sources at different distances from the optical axis OA, will perfectly superimpose one another in the output-side optical element 162, or the output-side lens T2, as well as in the objective 170 connected downstream from the optical beam expansion unit 161, 162, as will be explained by means of FIG. 6. When looking at FIG. 4 and FIG. 5, one may clearly discern a difference in the optical paths extending through the optical device 100.

Figure 6:
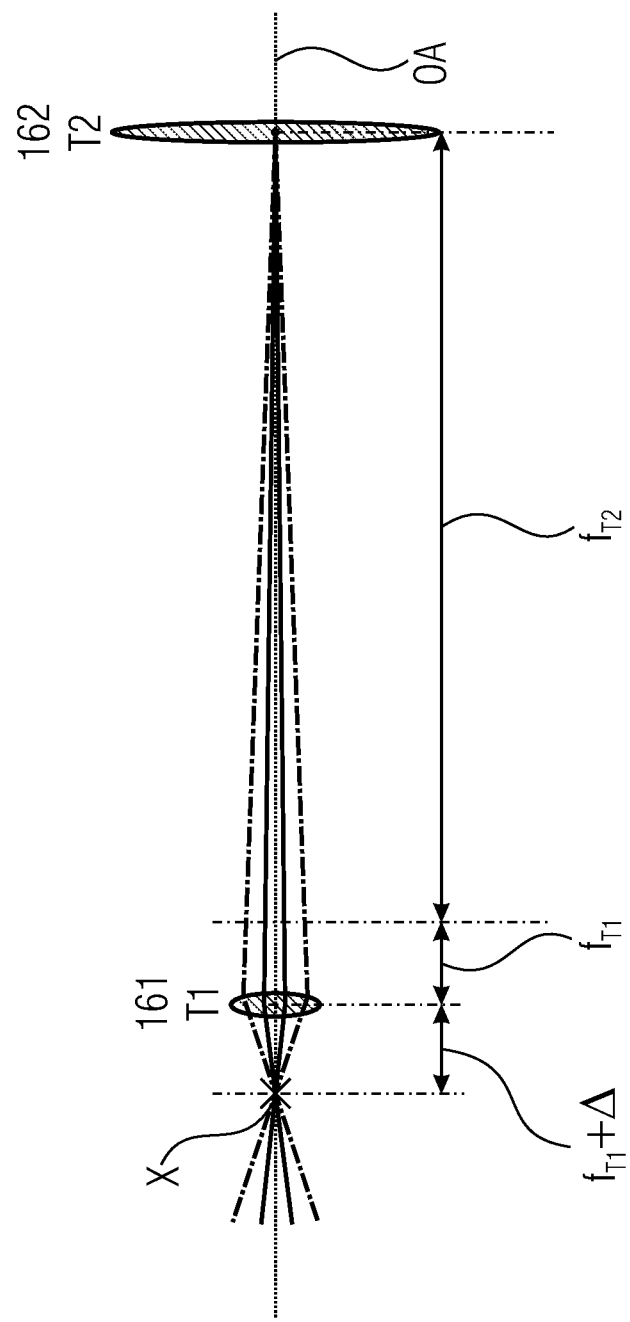
FIG. 6 shows a simplified diagram for illustrating superposition of bundles and beam expansion by means of an astronomic telescope for explaining an optimum condition for superposition of bundles of beams in accordance with an advantageous embodiment.

By means of FIG. 6, the above-mentioned dimensioning for optimum superposition of bundles of beams in accordance with an embodiment is to be illustrated. To this end, by way of simplifying matters, only that section of FIGS. 4 and 5 is shown which includes the point X at the location of superposition of the individual bundles of beams as well as the optical beam expansion unit 161, 162. The condition to be demanded consists in that the bundle centers of the bundles of beams, which coincide at a distance $f_{OE}$ after the imaging optical element 150, will also coincide again within a plane of the output-side optical element, or the output-side lens T2, of the telescope. In FIG. 6, the individual beams represent the respective centers of the individual bundles of beams, which originate from different positions of the imaging optical element 150 and extend toward the optical beam expansion unit 161, 162. The condition may be formulated as an imaging task, for which the following applies:

The point X, or object point, is a position which is located on the optical axis OA and at which all of the centers of the bundles of beams, i.e. the bundle centers, coincide. The point X is imaged by the lens T1, at the image distance $f_{T,1}+f_{T,2}$, into an image point that is also located on the optical axis. A defining quantity for meeting the imaging task is the distance between the object point, or X, and T1

To this end, the following are to be inserted into the imaging equation $$\frac{1}{s}+\frac{1}{s'}=\frac{1}{f} \quad \text{(ED 1)}$$

as the object width s, the quantity $f_{T1}+\Delta$
as the image distance s', the quantity $f_{T1}+f_{T2}$
and as the focal length f, the quantity $f_{T1}$,
as a result of which the quantity A to be determined amounts to $$\Delta = \frac{f_{T1}}{f_{T2}}(f_{T1}+f_{T2})-f_{T1}=f_{T1}^2/f_{T2}. \quad \text{(ED 2)}$$

In accordance with alternative embodiments, it shall suffice for A to be located within a range of ±50% of the value in accordance with ED 2.

For bundle superposition within the objective 170, minor modifications in A arise when a finite distance between T2 and the objective 170 is to be taken into account, e.g. when further optical elements are to be introduced into the optical path there.

Figure 7:
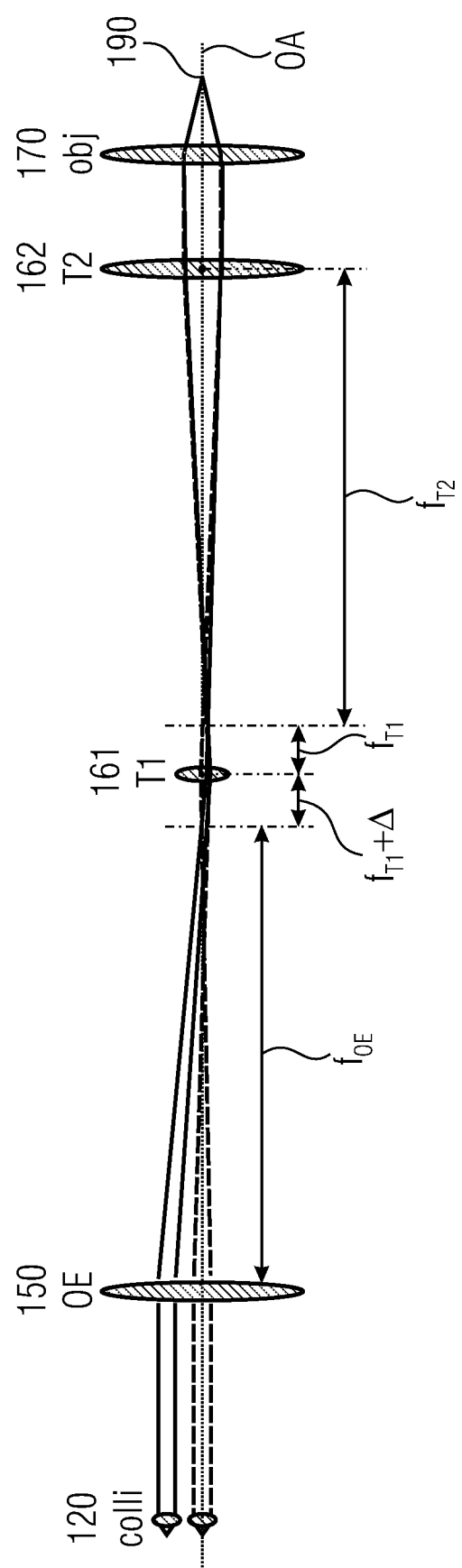
FIG. 7 shows a simplified diagram for illustrating superposition of bundles and beam expansion by means of an astronomic telescope for explaining non-optimum illumination of the objective with disadvantageously heavily collimated bundles of beams.

FIG. 7 shows a simplified diagram for illustrating bundle superposition and beam expansion be means of an astronomic telescope comprising lenses T1, T2 by analogy with preceding FIGS. 4 to 6 for explaining insufficient illumination of the objective 170 in case of too heavily collimated bundles of beams. Illumination of the output-side optical element, or of the output-side lens T2, of the optical beam expansion unit 161, 162 and/or the objective 170 connected downstream from the optical beam expansion unit 161, 162 is set in that the parallel bundles of beams, which impinge on the imaging optical element 150, exhibit a certain convergence or divergence—in other words, they are not collimated in an ideal manner. This may be gathered, in FIG. 4, from the left of the imaging optical element 150, the curved lines of the individual bundles of beams indicating Gaussian bundles of beams.

One can recognize from FIG. 7 that in case of too heavily collimated bundles of beams, the bundles of beams will illuminate only a very small part of the output-side optical element T2 and/or of the objective 170 connected downstream from the optical beam expansion unit 161, 162.

Figure 8:
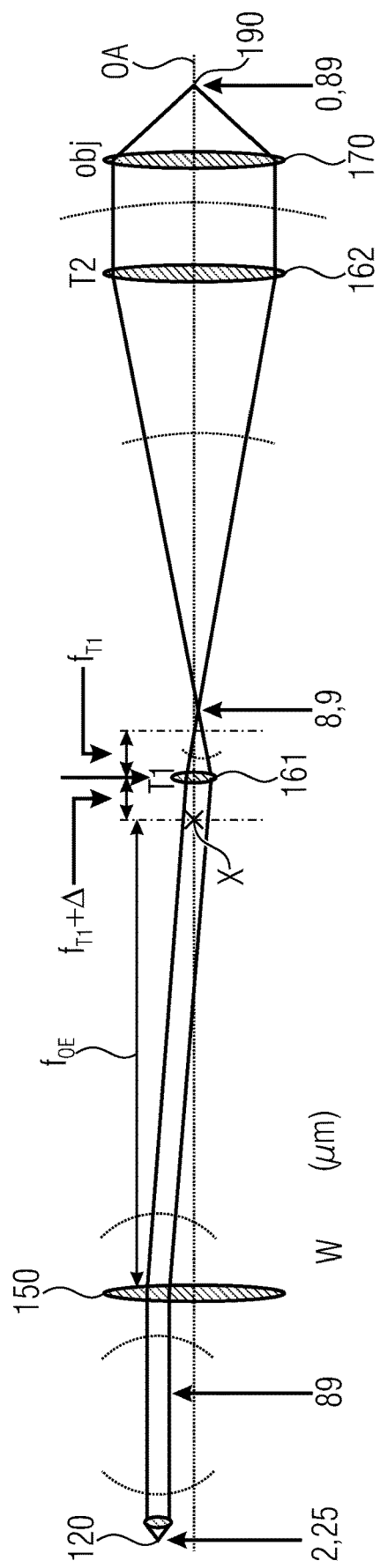
FIG. 8 shows a simplified diagram for illustrating beam expansion by means of an astronomic telescope in accordance with the embodiment of FIG. 1, comprising indications on the sizes of beam waists.

FIG. 8 shows a simplified diagram for illustrating beam expansion by means of an astronomic telescope in accordance with an embodiment in connection with explaining the Gaussian beam in FIG. 2. FIG. 8 describes an embodiment wherein the distances of source points $Y_i^{source}$ and target points $Y_i^{target}$ differ by a factor of 100. Accordingly, there is also a reduction in size of a bundle of beams, or of a bundle waist, as may be gathered from the waist sizes in FIG. 8. The starting point for the reduction in size of 100:1 is not the waist of the bundle of beams of the source 110 but the waist which is generated by a collimation lens 120 that is not set to perform ideal collimation. In the embodiment, the latter amounts to 89 micrometers and is transformed, by the 100:1 reduction in size within the focal plane of the objective, to a waist size of 0.89 micrometers.

Figure 9:
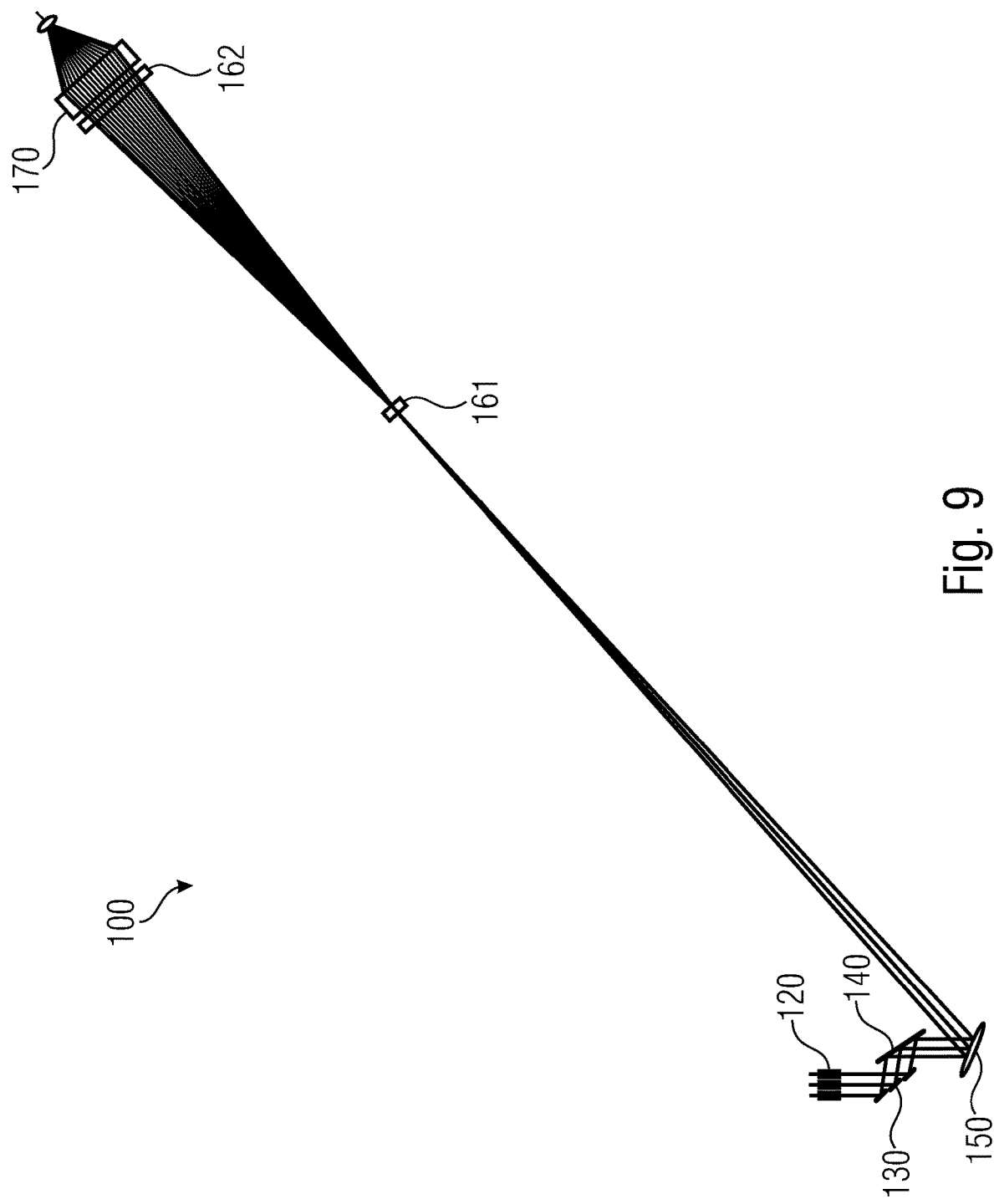
FIG. 9 shows a simplified diagram for illustrating the optical path of an optical device while using a refractive optical beam expansion unit in accordance with an embodiment.

FIG. 9 shows a simplified diagram for illustrating the optical path of an optical device 100 while using a refractive optical beam expansion unit 161, 162 in accordance with an embodiment. Unlike the embodiment of FIG. 1, the embodiment of FIG. 9 comprises a reflective optical element 150. The reflective imaging optical element 150 may be a parabolic mirror, for example. In the embodiment comprising a reflective imaging optical element 150—parabolic mirror— the source 110, or the collimator 120, is arranged at a specific angle so that no shadowing may occur.

Figure 10:
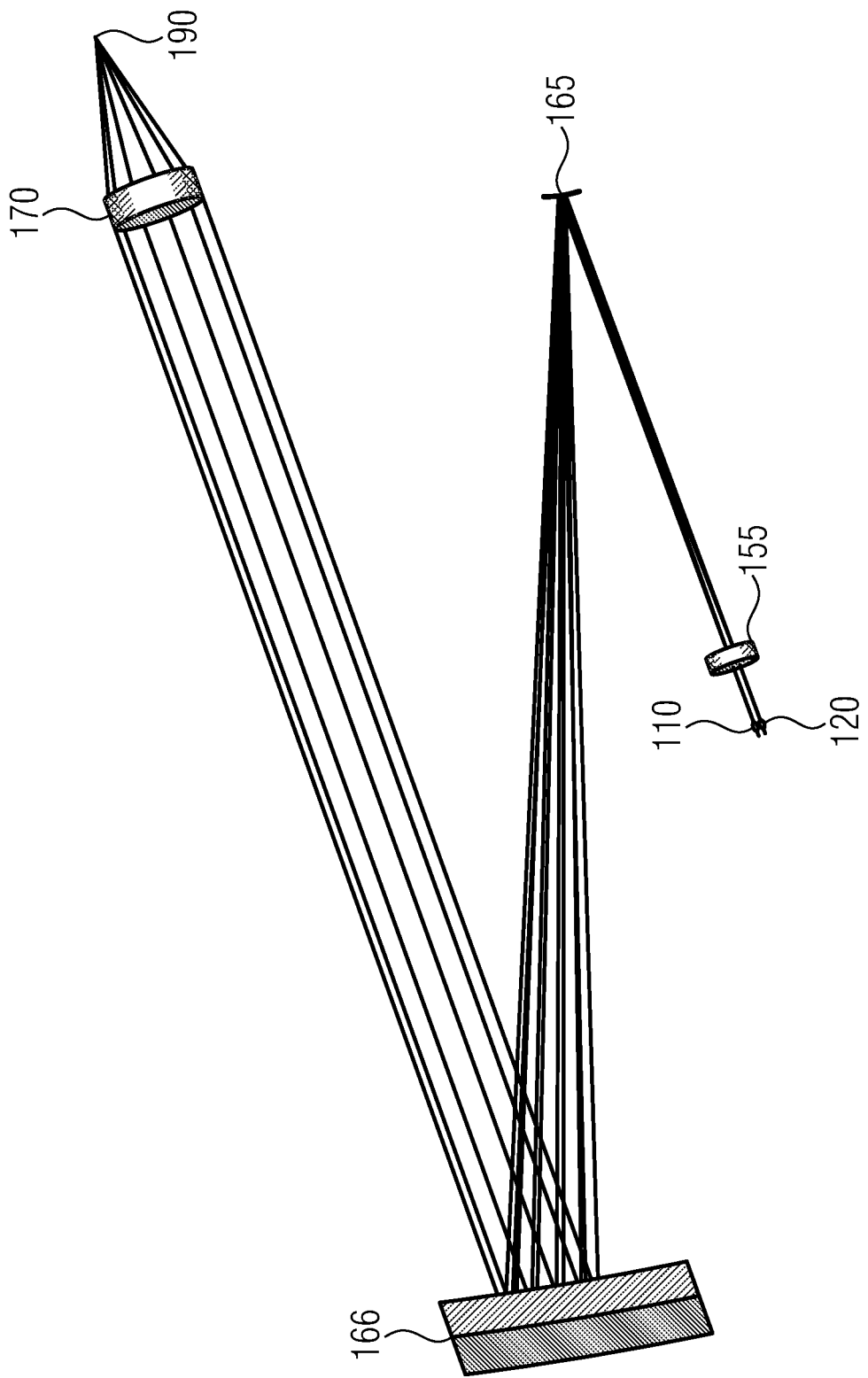
FIG. 10 shows a simplified diagram for illustrating the optical path of an optical device while using reflective optical beam expansion unit in accordance with a further embodiment.

FIG. 10 shows a simplified diagram for illustrating the optical path of an optical device 100 while using a reflective optical beam expansion unit 165, 166. Unlike the above-explained embodiments of FIGS. 1 and 3 to 9, the embodiment of FIG. 10 comprises no rearrangement unit 130, 140. The individual parallel bundles of beams of the beam source 110 are guided, via collimator 120, directly to an imaging optical element 155, from where the bundles of beams are forwarded, via an optical beam expansion unit 165, 166 in the form of a reflective telescope including two parabolic mirrors, to the objective 170, via which the beams are focused into an image surface 190.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The research work that has led to these results has been supported by the European Union.

The invention claimed is:

1. Optical device for imaging a first, object-side set of mutually parallel bundles of beams onto an image surface, comprising
   an optical beam expansion unit;
   an optical rearrangement unit configured to rearrange the first set of mutually parallel bundles of beams while maintaining mutually parallelism so as to achieve a second set of mutually parallel bundles of beams;
   an optical element configured to direct the second set of mutually parallel bundles of beams onto the optical beam expansion unit by means of bundling, so that the optical beam expansion unit is reached by a third set of bundles of beams, the optical beam expansion unit being configured to expand each bundle of beams of the third set so as to achieve a fourth set of expanded bundles of beams; and
   an optical imaging unit configured to image the fourth set of expanded bundles of beams onto the image surface;

wherein the optical rearrangement unit is controllably adjustable to set rearrangement of the second set of bundles of beams as compared to the first set of bundles of beams; and wherein the optical rearrangement unit comprises mechanically adjustable mirrors.

2. Optical device as claimed in claim 1, comprising a source for each bundle of beams of the first set of bundles of beams, from which the respective bundle of beams impinges upon the optical rearrangement unit.

3. Optical device as claimed in claim 2, wherein the source for each bundle of beams of the first set of bundles of beams comprises a monomode source or a multimode source.

4. Optical device as claimed in claim 3, comprising a collimator for each bundle of beams of the first set of bundles of beams through which the respective bundle of beams of the first set of bundles of beams passes in a direction of the optical rearrangement unit.

5. Optical device as claimed in claim 1, comprising, for each bundle of beams of the first set of bundles of beams, a monomode fiber comprising a GRIN lens as a collimator.

6. Optical device as claimed in claim 5, wherein the optical imaging unit comprises a diameter larger than or equal to 1.5 times a cross-section of a bundle of beams of the fourth set of bundles of beams.

7. Optical device as claimed in claim 1, wherein the optical element is configured to bundle the second set of bundles of beams at a predetermined distance, which is smaller than double a focal length of an input-side optical element of the optical beam expansion unit in front of or behind the input-side optical element, so that the bundles of beams of the third set of bundles of beams superimpose one another.

8. Optical device as claimed in claim 7, wherein the predetermined distance amounts to between 0.5 and 1.5 times the focal length of the input-side optical elements.

9. Optical device as claimed in claim 7, wherein the predetermined distance amounts to between 0.5 and 1.5 times $f_{T,1}+\Delta$, with $$\Delta = \frac{f_{T1}}{f_{T2}}(f_{T1} + f_{T2}) - f_{T1} = f_{T1}^2 / f_{T2}$$

wherein $f_{T1}$ is the focal length of the input-side optical element, and $f_{T2}$ is the focal length of an output-side optical element of the optical beam expansion unit, which together form a telescope.

10. Optical device as claimed in claim 1, wherein the optical element is configured as a one- or multi-stage refractive optical element.

11. Optical device as claimed in claim 1, wherein the optical element is configured as a reflective optical unit.

12. Optical device as claimed in claim 1, comprising bearings by means of which the mechanically adjustable mirrors are linearly moveable.

13. Optical device as claimed in claim 1, wherein the optical rearrangement unit comprises mechanical and/or piezoelectric and/or magnetically drivable actuating elements.

14. Optical device as claimed in claim 1, wherein the optical rearrangement unit is configured to achieve rearrangement in a path length preserving manner, so that each bundle of beams of the first set of bundles of beams, when passing through the optical rearrangement unit so as to become, or contribute to, a bundle of beams of the second set of bundles of beams, covers a path length that is independent of any setting of the rearrangement.

15. Optical device as claimed in claim 12, wherein the optical rearrangement unit comprises a rigid mirror arranged, along an optical path of the optical device, behind the adjustable mirrors.

16. Optical device as claimed in claim 1, wherein the optical rearrangement unit is configured to rearrange the first set of bundles of beams, that are parallel to a beam direction of the first set of bundles of beams while maintaining parallelism with one another and with the beam direction in such a manner that the second set of bundles of beams is parallel to the beam direction.

17. Optical device as claimed in claim 1, wherein the optical beam expansion unit is configured as a refractive telescope.

18. Optical device as claimed in claim 1, wherein the optical beam expansion unit is configured as a reflective telescope.

19. Optical device as claimed in claim 1, wherein the bundles of beams of the first set comprise monochromatic light.

20. Optical device as claimed in claim 1, wherein the optical beam expansion unit illuminates more than 50% of the optical imaging unit by means of each bundle of beams of the fourth set of bundles of beams.

* * * * *